350-6.8

XR 3,626,091

SEARCH ROOM

United Stat

[11] 3,626,091

SUBSTITUTE FOR MISSING XR

[72] Inventor Robert P. Casper
Los Angeles, Calif.
[21] Appl. No. 884,088
[22] Filed Dec. 11, 1969
[45] Patented Dec. 7, 1971
[73] Assignee Hughes Aircraft Company
Culver City, Calif.

[54] IMAGE CONVERTER
16 Claims, 5 Drawing Figs.

[52] U.S. Cl. 178/7.6, 178/DIG. 8, 350/285
[51] Int. Cl. H04n 3/08
[50] Field of Search 178/7.6; 350/285

[56] References Cited

UNITED STATES PATENTS

| | | | |
|---|---|---|---|
| 1,787,920 | 1/1931 | Watson | 178/7.6 UX |
| 1,790,491 | 1/1931 | Smith | 178/7.6 |
| 1,964,580 | 6/1934 | Ives | 178/7.6 |
| 1,990,183 | 2/1935 | Gray | 178/7.6 |
| 3,069,493 | 12/1962 | Martel | 178/7.6 X |
| 3,316,348 | 4/1967 | Hufnagel et al. | 350/285 UX |

*Primary Examiner*—Robert L. Richardson
*Assistant Examiner*—Richard K. Eckert, Jr.
*Attorneys*—James K. Haskell and Walter J. Adam

ABSTRACT: Real time raster scanning of a field is provided by rotating an N-sided prismatic mirror about its axis of symmetry. N may be any integer equal to or greater than two. Mirror faces on the prism are aligned with respect to the axis of rotation such that each face deviates the look angle of a detector by an amount equal to one resolution element (for contiguous scan lines). Rotation about the axis of symmetry produces a scan pattern similar to that of a TV system. The scan pattern is reconstructed by converting the output of the detector, into modulated light which is directed upon a rotating N-sided prismatic mirror with the restriction that the mirror face upon which the light is directed has the identical angle with respect to the axis of rotation as the mirror face which the detector sees at that time.

PRISMATIC MIRROR SCANNER

INVENTOR.
ROBERT P. CASPER,
BY
Walter J. Adam
ATTORNEY.

IMAGE CONVERTER

BACKGROUND OF THE INVENTION

This invention relates to mechanical raster scanning systems, and more particularly to improvements therein.

The raster scanning or dissection of an image for the purpose of recreating it elsewhere is usually resorted to where the medium for transmitting the image from the location at which it exists to the location at which it is recreated does not have the bandwidth for transmitting the entire image simultaneously, or even substantial portions thereof. Thus, the image is dissected, in television, by a camera which scans the image line by line and converts the information received into a train of electrical signals. These are transmitted, received, and then recreated. Applications for raster scanning arise in other areas such as facsimile, or infrared scanning systems wherein the speed requirements for scanning are not as high as they are in television, and therefore slower, less expensive mechanical raster scanning systems may be employed. In facsimile a rotating drum plus a reciprocating scanning head is employed.

No simple, compact and inexpensive system has been provided however, which affords raster scanning together with an arrangement for recreating the image, which system is sufficiently compact and light in weight to be easily portable.

OBJECTS AND SUMMARY OF THE INVENTION

An object of this invention is the provision of an optical mechanical raster scanning system which is simpler than those devised heretofore.

Another object of this invention is the provision of a portable and compact raster scanning system.

Yet another object of the invention is the provision of a novel, and useful optical-mechanical raster scanning system.

These and other objects of the invention are achieved in an arrangement which, by way of example, can comprise an N-sided polygonal prismatic mirror. The mirror is rotated about its axis of rotation. Interlace is achieved by progressively tilting the faces of the prismatic mirror with respect to the axis of rotation. In one embodiment of the invention, faces of the mirror which are on opposite sides of the polygon are aligned at equal and opposite angles with respect to the axis of rotation, thus providing the capability for a synchronous, direct view, real time display. A radiation to electrical signal transducer is used to view a side of the prismatic mirror which receives radiation from a desired region of the field of view. The transducer output may be used to either modulate the electron ray beam of a cathode-ray tube which has a scanning raster synchronized with that produced by the rotating prismatic mirror so that the scene is displayed on the face of the cathode-ray tube. Alternatively, the output of the transducer is used to modulate the intensity of a light source. Light from the light source is directed at the surface of the mirror opposite to the one scanning the field of view at the time. The viewer looks at the mirror whose surface is illuminated and, the rotation of the prismatic mirror thereby serves both for raster scan and view recreation.

An alternative arrangement to the one described may be one in which the prismatic mirror, instead of being a solid, has a hollow center. The inside surfaces of the body thus created are also mirrors. In this arrangement the outside mirror surface and the inside mirror surface are aligned at equal angles with respect to a line perpendicular to the axis of rotation. Recreation of the image is provided by shining the controlled light source at the mirror surface which is directly behind the scanning mirror. The light reflected from this mirror surface may then be directed to the viewer by using a sequence of stationary reflecting mirrors.

In yet another embodiment of the invention, two polygonal prismatic mirrors are employed having identical construction. Both are rotated together and one of the polygons is used for viewing and the other of the polygons is used for image reconstruction.

The novel features of the invention are set forth with particularity in the appended claims. The invention will best be understood from the following description when read in conjunction with the accompanying drawings.

DESCRIPTION OF THE EMBODIMENTS OF THE INVENTION

Figure 1:
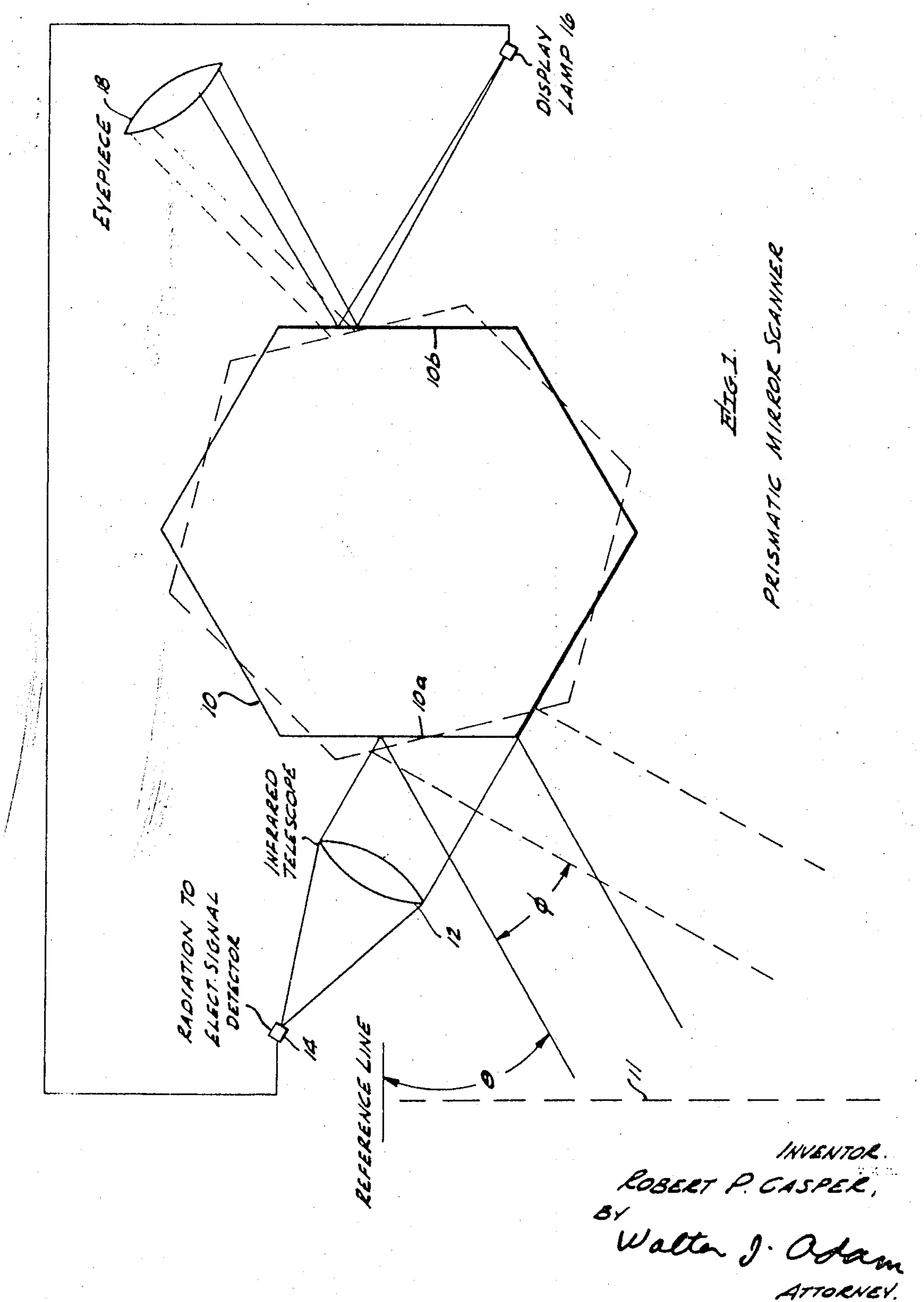
FIG. 1 is a schematic illustration of the prismatic mirror concept which is employed in the invention.

FIG. 1 represents a schematic arrangement which illustrates the prismatic mirror concept, in accordance with this invention, used for a scan device and for reconstructing the scanned image. Scanning of the scene is performed by the rotation of an N-sided prismatic mirror 10, which is positioned to receive radiation from a field 11. When the prismatic mirror is in the position represented by the solid lines, radiant energy is collected by the lens system 12, from objects whose position are at an angle $\theta$ with respect to a selected reference line. This radiant energy is reflected by the scanning face 10*a* of the prismatic mirror 10 to a radiation to electrical signal detector array 14.

The light to electrical signal array may comprise one or more transducers, such as photocells or infrared detectors, which convert the radiant energy, which is received from the prismatic mirror surface 10*a*, into electrical signals.

These electrical signals are then applied to a controlled light source, which by way of example may be a display lamp array 16, to control the intensity of the light in response to the electrical signals. The display lamp array can comprise one or more lamps whose light output may be controlled in response to the respective signals from the radiation to electrical signal detector array. The display lamp array light is directed to the surface 10*b* of the prismatic mirror 10 which is opposite to the scanning prismatic mirror surface. This latter surface, 10*b*, is known as the viewing surface. Light from the viewing surface is collected by a lens system 18.

Figure 2:
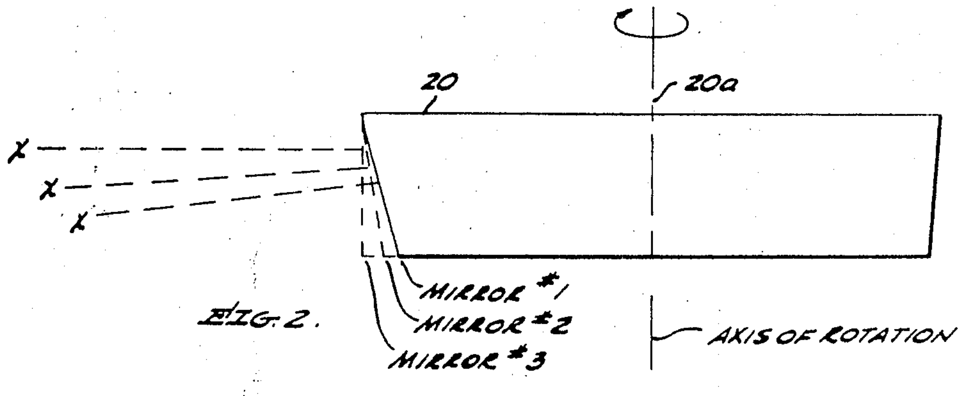
FIG. 2 illustrates how raster scanning is accomplished with the prismatic mirror concept illustrated in FIG. 1.

When the N-sided prismatic mirror is rotated counterclockwise to the position represented by the dotted lines, energy is collected from objects whose rays are at an angle $(\theta+\Phi)$, with respect to a selected reference line shown in FIG. 1. If the faces of the prismatic mirror are all parallel to one another, as the mirror rotates, only a repetitive scan along a single line would occur. In order to accomplish raster scanning, the respective faces of the N-sided prismatic mirror are aligned at small and different angles with respect to the axis of rotation. This is schematically represented in FIG. 2, wherein a prismatic mirror 20 having an axis of rotation at 20*a*, has N sides. Each side constituting a different mirror, is at a different angle to the axis of rotation as is the adjacent side. For a radiation to electrical signal detector array in which the detector elements are contiguous, the angular deviation between mirror faces (indicated by the dotted line in FIG. 2 and designated as mirrors 1, 2 and 3,) is equal to one-half the angular width of the detector array.

For non contiguous detector arrays the angular deviation between mirror faces is equal to one half the angular width of a single detector element in said array.

Figure 3:
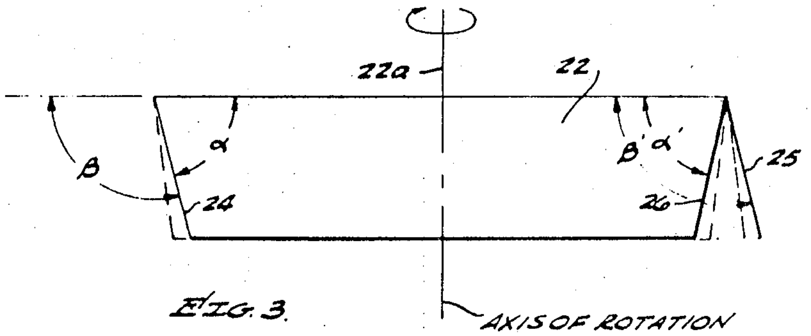
FIG. 3 represents a mirror arrangement in accordance with this invention which accomplishes both raster scanning and image reconstruction.

In order to reconstruct the image scanned by a raster scanning mirror arrangement as shown in FIG. 2, a configuration for the prismatic mirror schematically shown in FIG. 3 is employed. The prismatic mirror 22 is termed an N-sided, K cycle, prismatic mirror. K is the number of repetitive scan cycles designed into the alignment of the mirror faces and is equal to the number of scan frames produced per revolution of the prismatic mirror. The arrangement shown in FIG. 3 represents a double-cycle (K=2) configuration, producing two frames per revolution. (Note: for this configuration K is equal to or greater than 2 and must be an integer.) Opposite faces of the mirror respectively 24, 26, are at equal angles with respect to a line perpendicular to the axis of rotation for all configurations where K is even. Thus, angles $\alpha$ and $\alpha'$ are equal. The interlace ratio for the K cycle, N-sided prismatic mirror configuration is equal to N/K. On the assumption that N=12, a table of mirror face tilt angles may be constructed for the configuration shown in FIG. 3.

| Mirror Face | Degrees Angle—Milliradians |
|---|---|
| Face 1 | 90° |
| 2 | 90°-1.0 |
| 3 | 90°-2.0 |
| 4 | 90°-3.0 |
| 5 | 90°-4.0 |
| 6 | 90°-5.0 |
| 7 | 90° |
| 8 | 90°-1.0 |
| 9 | 90°-2.0 |
| 10 | 90°-3.0 |
| 11 | 90°-4.0 |
| 12 | 90°-5.0 |

Reconstruction of the scene which is viewed is accomplished in the manner shown in FIG. 1, by relaying the output from the display lamp to the viewer's eye by a reflection from the opposite face of the rotating prismatic mirror. Thus, if the scanning face is one, the viewing face is seven. If the scanning face is two, the viewing face is eight, etc. Rotation of the mirror causes the display lamps to appear to scan unidirectionally in the same manner in which the detectors scan the scene.

Figure 4:
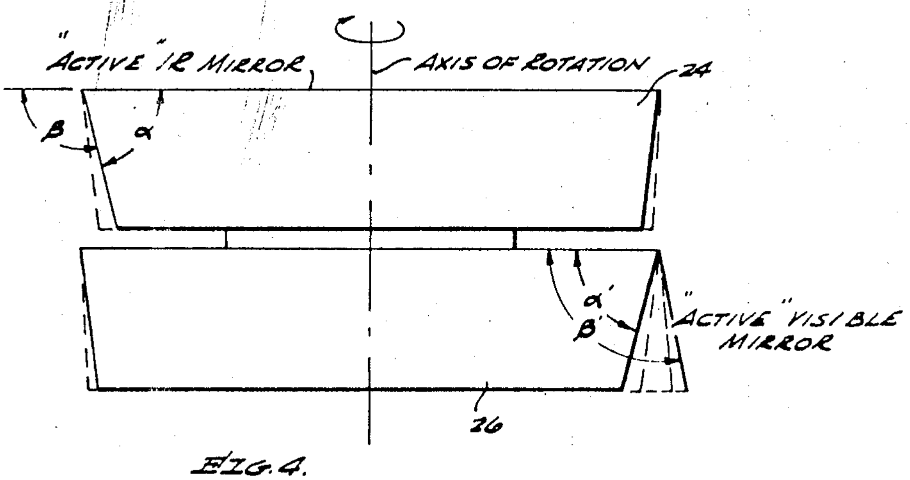
FIG. 4 is another arrangement of prismatic mirrors in accordance with this invention for raster scanning and image reconstruction.

FIG. 4 shows a configuration which may be termed a "double-layer," N-sided, K-cycle prismatic mirror. In this approach, the upper prismatic mirror 24 may be used for scanning a scene, and the lower prismatic mirror 26, may be used for reconstructing the scene. Both prismatic mirrors have N sides and can be constructed identically. If the viewer wishes to view the reconstructed scene in the same direction as the scanning mirror is viewing, then the lower prismatic mirror is positioned 180° out of phase with the upper prismatic mirror so that the active scene viewing mirror and the active reconstruction mirror are at equal angles with respect to a line perpendicular to the axis of rotation. The interlace ratio for this configuration is also N/K.

In another arrangement of FIG. 3 in accordance with the principles of the invention the opposite mirror faces are aligned such that form equal angles with respect to a line perpendicular to the axis of rotation. As shown in FIG. 3 line 25 parallel to line 24, the position thereof defined by equal angles $\beta$ and $\beta'$. In another arrangement of FIG. 4 in accordance with the invention, the active IR mirror and the active visible mirror form equal angles with respect to a line perpendicular to the axis of rotation as shown in FIG. 3 by lines defined by equal angles $\beta$ and $\beta'$.

Figure 5:
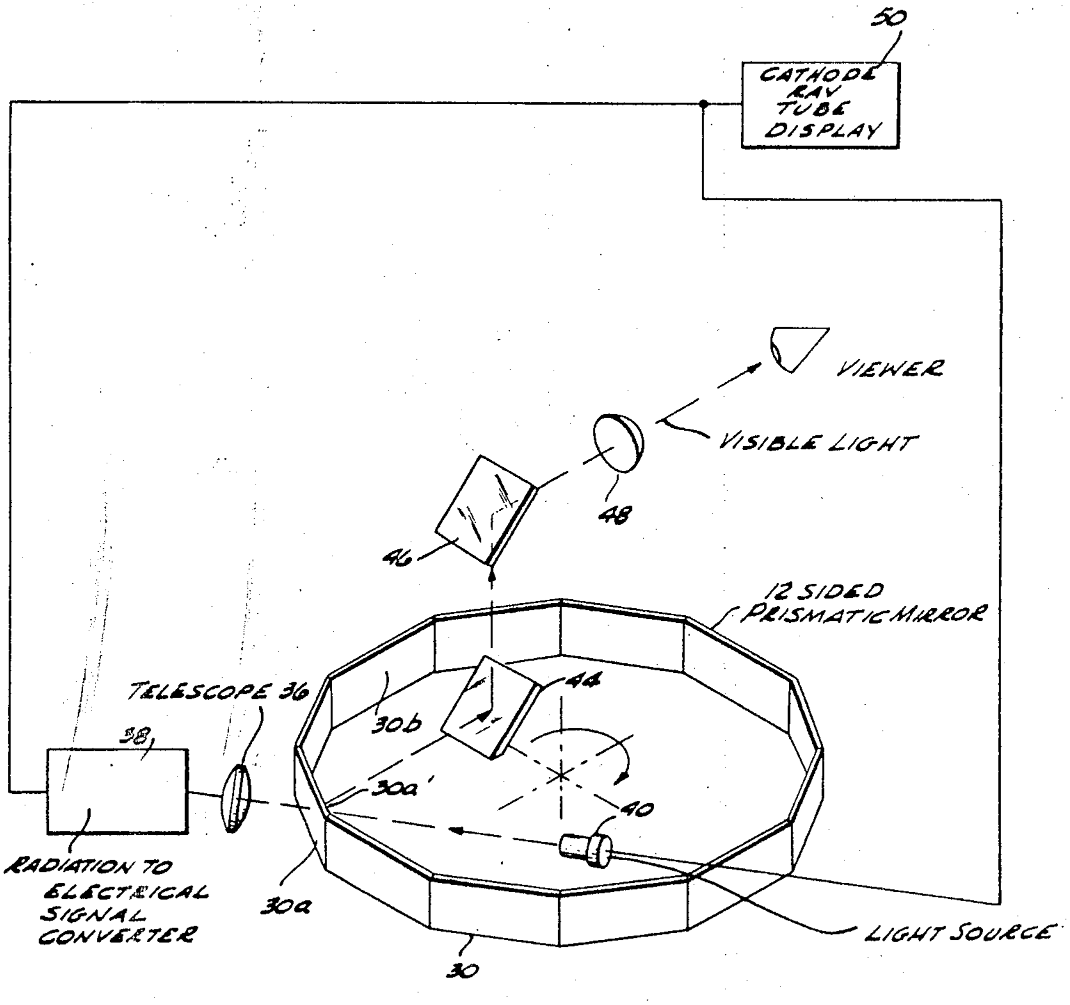
FIG. 5 illustrates yet another arrangement for a prismatic mirror for affording raster scanning and image reconstruction.

Yet another arrangement of an embodiment of the invention is shown in FIG. 5. This arrangement is termed a double surface, N-sided, K-cycle, prismatic mirror. A 12-sided mirror 30, is shown by way of example. The center of the prismatic mirror is not solid but is hollow and there are both outside surfaces 30*a*, for example, and inside mirror surfaces 30*b* for example. The front and back surfaces or the inside and outside mirrors which comprise the front and back surfaces, are aligned at equal angles with respect to a line perpendicular to the axis of rotation. The interlace ratio is N divided by K.

The reconstruction of the image scanned is achieved by directing the reflected radiation to the lens system 36, of a telescope. The lens system directs the light passing therethrough to a radiation to electrical signal converter 38. The electrical signal output is used to modulate a light source 40 (which may be a lamp, diode or any suitable light-emitting source capable of being modulated). The light from the light source is directed at the mirror surface 30*a'* in back of the surface 30*a*. This mirror surface 30*a'* which has an angle, equal and opposite with respect to the axis of rotation to that of the mirror 30*a*, reflects the light onto the surface of a reflecting mirror 44. This mirror reflects the light it receives onto the mirror surface of the mirror 46. Another lens system arrangement 48, directs the light received from the mirror 46 to the eye of a receiver or viewer. If a cathode ray tube display is desired, then the signal from the light to electrical signal converter may be applied to the cathode-ray display apparatus 50. The requirement there is that the cathode-ray sweep be synchronized with the rotation speed of the prismatic mirror. That is, the time required for the cathode-ray beam to cover one line should be equal to the time required for one mirror face to pass through the scene viewing location.

If the viewer wishes to view the reconstructed scene in the same direction as the scanning mirror is viewing, with the illustrated mirrors 44 and 46, then the inside mirror surface is positioned in phase with the outside mirror so that the active scene viewing mirror and the active reconstruction mirror are at the same angular positions with respect to a line perpendicular to the axis of rotation. However, other relations between the angles with respect to a line perpendicular to the axis of rotation of the active inside and outside mirrors may be utilized in accordance with the principles of the invention.

The interval for a single frame should be the time required for a complete cycle of rotation of the prismatic mirror shown in FIG. 5, if K equals 1. If K has another value then this determines the frame interval.

In all of the arrangements of FIG. 1 to 5, the aspect ratio between the scanned object and the reconstructed image is to be maintained, then the active scene scanning mirror and the active reconstruction mirror must be at equal angles with respect to a line perpendicular to the axis of rotation. However, if scene distortion is desired under certain circumstances, then the active scene scanning mirror and the active reconstruction mirror may be at different angles with respect to a line perpendicular to the axis of rotation.

It is to be noted that the inside outside mirror surfaces of the prismatic mirror assembly can be aligned to either of the following configurations; the front and rear surfaces can be aligned such that they make equal and opposite angles with respect to a line perpendicular to the axis of rotation, (the front and rear surfaces have a wedge configuration) or the front and rear surfaces may be aligned such that these surfaces are parallel to each other and they form equal angles with a line perpendicular to the axis of rotation.

From the foregoing description it should be appreciated that an optical mechanical raster scanning arrangement is provided wherein a prismatic mirror, in the form of a polygon, has each scanning mirror face thereof tilted at a different angle with respect to the adjacent mirror face whereby, a detector will have reflected thereonto different lines from a scene as the prismatic mirror is rotated on its axis. The output of the detector can be used to reconstruct the scene, by employing either a cathode ray tube or by employing other mirror faces of a prismatic mirror for viewing. In this case these viewing faces must make an angle which is equal with respect to the axis of rotation as is made by scanning face with the axis of rotation.

What is claimed is:

1. A raster scanning and display system comprising a prismatic mirror having an outside shape in the form of a polygon each polygon side comprising:

an outside mirror face;

said polygon having an axis of rotation extending through the center thereof;

means for rotating said prismatic mirror on its axis of rotation;

one-half of the adjacent mirror faces making successively increasing angles with said axis of rotation;

each of the remaining mirror faces making an angle with the axis of rotation which is equal to the angle made by the mirror face opposite thereto;

a scene scanning location adjacent one side of said rotating prismatic mirror;

transducer means for converting the radiant energy reflected by the mirror face rotating through the scene scanning location into electrical energy;

means responsive to said electrical energy for producing a modulated light beam;

means for directing said modulated light beam at the side of said prismatic mirror which is opposite to the scene scanning location side; and means for viewing the light reflected from the mirror faces in response to said modulated light energy.

2. Apparatus for optically raster scanning a scene comprising a first N-sided prismatic mirror, a second N-sided prismatic mirror, each mirror side being at an angle with respect to the axis of rotation which increases for each successive mirror side by a predetermined amount in sequence around said N-sided prismatic mirror;

means for rotating said first and second prismatic mirrors together on their common axis of rotation;

a scene scanning location adjacent said first prismatic mirror;

transducer means for converting radiation reflected from said first prismatic mirror to electrical energy representative thereof;

light means responsive to said electrical energy for producing light varying in intensity in accordance therewith;

means for directing said light from said light means toward said second prismatic mirror; and means for viewing the light reflected from said second prismatic mirror.

3. An optical raster scanning arrangement including an N-sided prismatic mirror having outside mirror surfaces and inside mirror surfaces which are in back to back relationship with the outside mirror surfaces;

each of said outside mirror surfaces making an angle with the axis of rotation which increases in sequence in a predetermined manner from outside mirror surface to outside mirror surface around said prismatic mirror;

each of the inside surface prismatic surface prismatic mirrors making an angle which is equal and opposite to the angle made by the outside mirror surface with which it is in back to back relationship;

a scanning location adjacent said N-sided prismatic mirror;

transducer means for converting radiation reflected from said prismatic mirror into corresponding electrical signals;

light means modulated responsive to said electrical signals for producing modulated light radiation;

means for directing said modulated light radiation toward the inside mirror surfaces of said prismatic mirror; and means for viewing the light reflected from said inside prismatic mirror surfaces.

4. An apparatus for scanning a field of view and for providing optical imagery from the received scanned energy, said apparatus comprising:

a mirror assembly having a plurality of mirror faces and an axis of rotation passing through the center of said assembly, with said mirror faces making various angles with said axis of rotation such that as said assembly is rotated about said axis energy applied thereto is reflected in a two-dimensional pattern;

means for rotating said mirror assembly about its axis to sequentially move at least some of said mirror faces through a scanning location, and to move at least some of said mirror faces through a reconstruction location, said locations being displaced from each other;

transducer means for converting the energy reflected from the mirror faces rotating through the scanning location into an electrical signal; and reconstruction means responsive to said electrical signal for producing a modulated light beam and for directing said modulated light beam to said reconstruction location; whereby the modulated light reflected from the mirror faces rotating through the reconstruction location provides optical imagery as a function of the received scanned energy.

5. The apparatus of claim 4 wherein said transducer means includes an infrared detector.

6. The apparatus of claim 4 wherein said mirror assembly has a polygonal cross section through said mirror faces, and said scanning location and said reconstruction location are displaced about said axis of rotation.

7. The apparatus of claim 6 wherein said reconstruction means includes means for directing said modulated light beam at a reconstruction location disposed on the opposite side of said mirror assembly from said scanning location.

8. The apparatus of claim 6 wherein the angles of said mirror faces relative to said axis of rotation are such that mirror faces in the scanning and reconstruction locations at any given time form equal angles with said axis of rotation.

9. The apparatus of claim 6 wherein the angles of said mirror faces relative to said axis of rotation are such that mirror faces in the scanning and reconstruction locations at any given time form opposite angles with the axis of rotation.

10. The apparatus of claim 6 wherein the angles relative to the axis of rotation made by each one of one-half of the mirror faces which are adjacent to one another, are equal to the angles of a corresponding mirror face of the other one-half.

11. The apparatus of claim 4 wherein said mirror assembly includes first and second mirror structures having a common axis of rotation and each structure has a plurality of mirror faces arranged to have a polygonal cross section; said transducer means is disposed to receive energy from a scanning location associated with one of said mirror structures; and said reconstruction means is disposed to direct said modulated energy to a reconstruction location associated with the other of said structures.

12. The apparatus of claim 11 wherein the angles of said mirror faces relative to said axis of rotation are such that mirror faces in the scanning and reconstruction locations at any given time form equal angles with the axis of rotation.

13. The apparatus of claim 11 wherein the angles of said mirror faces relative to said axis of rotation are such that mirror faces in the scanning and reconstruction locations at any given time form opposite angles with the axis of rotation.

14. The apparatus of claim 11 wherein said mirror assembly is hollow and has inside and outside mirror faces in a back to face relationship disposed to have a polygonal cross section through said mirror faces, and said transducer means is disposed to receive energy from a scanning location associated with either said inside or said outside set of mirror faces and said reconstruction means is disposed to direct said modulation energy to a reconstruction location associated with the other set of said mirror faces.

15. The apparatus of claim 11 wherein the angle of each said inside mirror relative to said axis of rotation, is equal to the angle of the oppositely disposed outside mirror.

16. The apparatus of claim 14 wherein the angle of each said inside mirror relative to said axis of rotation, is opposite from the angle of the oppositely disposed outside mirror.

* * * * *